United States Patent

[11] 3,573,552

| | | |
|---|---|---|
| [72] | Inventor | Thorleif Forfod<br>Dingtuna, Sweden |
| [21] | Appl. No. | 810,991 |
| [22] | Filed | Mar. 27, 1969 |
| [45] | Patented | Apr. 6, 1971 |
| [73] | Assignee | Allmanna Svenska Elecktriska Aktiebolaget<br>Vasteras, Sweden |
| [32] | Priority | Apr. 24, 1968 |
| [33] | | Sweden |
| [31] | | 5483/68 |

[54] HIGH-IMPEDANCE, PERCENTAGE-STABILIZED BUSBAR DIFFERENTIAL PROTECTION
2 Claims, 3 Drawing Figs.

[52] U.S. Cl.................................................. 317/18,
317/26, 317/27
[51] Int. Cl.................................................. H02h 3/16
[50] Field of Search.................................... 317/27, 18,
32, 26; 324/51

[56] References Cited
UNITED STATES PATENTS
2,608,606  8/1952  Sonnemann.................. 317/27
3,492,533  1/1970  Thurston...................... 317/18

Primary Examiner—J. D. Miller
Assistant Examiner—Harvey Fendelman
Attorney—Jennings Bailey, Jr.

ABSTRACT: A relay device operating in response to abnormal conditions in a line includes an arrangement for deriving from the line a current proportional to the current in the line. One terminal of this current deriving device is connected to the midpoint of a pair of rectifiers connected in series. The other terminal is connected to the midpoint between resistances of equal value connected in series with the pair of rectifiers. In the connection between the midpoint of the resistances and the terminal of the current deriving device is arranged the primary of a transformer. The secondary of this transformer through a full-wave rectifier feeds the relay in parallel with a resistance. The arrangement is such that the relay is fed with the difference between the voltage across the latter resistance and the voltage across the two equal resistances.

INVENTOR.
THORLEIF FORFOD
BY
Jennings Bailey ously good protection at moderate values of fault currents. However, at high values of fault currents, with a large DC time-constant and relatively poor line current transformer characteristics, maloperation may occur in the case of external faults. In the case of internal faults, operation may either be delayed until the DC transient has expired or operation may not take place at all.

HIGH-IMPEDANCE, PERCENTAGE-STABILIZED BUSBAR DIFFERENTIAL PROTECTION

BACKGROUND OF THE INVENTION

1. Field of the Invention

The invention relates to a protective relay device for use in connection with a bus bar.

2. The Prior Art

Known bus bar differential protection relays provide a reasonably good protection at moderate values of fault currents. However, at high values of fault currents, with a large DC time-constant and relatively poor line current transformer characteristics, maloperation may occur in the case of external faults. In the case of internal faults, operation may either be delayed until the DC transient has expired or operation may not take place at all.

Further, the known protective systems can in a number of cases not be proved by simple calculations to satisfactorily provide the so-called stability features.

SUMMARY OF THE INVENTION

The present invention concerns a high-impedance, percentage-stabilized bus bar differential protection relay which, by simple calculations, can be proved to be absolutely stable on external faults, independent of the magnitude of the system fault—MVA, the system DC time-constant, remanence of line current transformers and of auxiliary ratio-correction current transformers. Similarly, decisive operation on internal faults can be guaranteed to take place on the first initial rise of the fault current (prior to saturation of current transformers), independent of the same features as just mentioned above. The line current transformers may be of a standard design, and the turns ratio may differ between the various feeders connected to the bus bar. This protection is achieved by an effective high ohmic resistance in the differential circuit and by two resistors in the stabilizing circuit. The effective ohmic value of the differential circuit resistance is basically equal to the maximum DC loop-resistance of any one of the line current transformer secondary circuits. The ohmic value of the stabilizing resistors is less than the effective resistance of the differential circuit, and basically determined by the selected percentage-stabilizing characteristic.

BRIEF DESCRIPTION OF THE DRAWINGS

On the attached single-line diagram.

DESCRIPTION OF THE PREFERRED EMBODIMENTS

Figure 1:
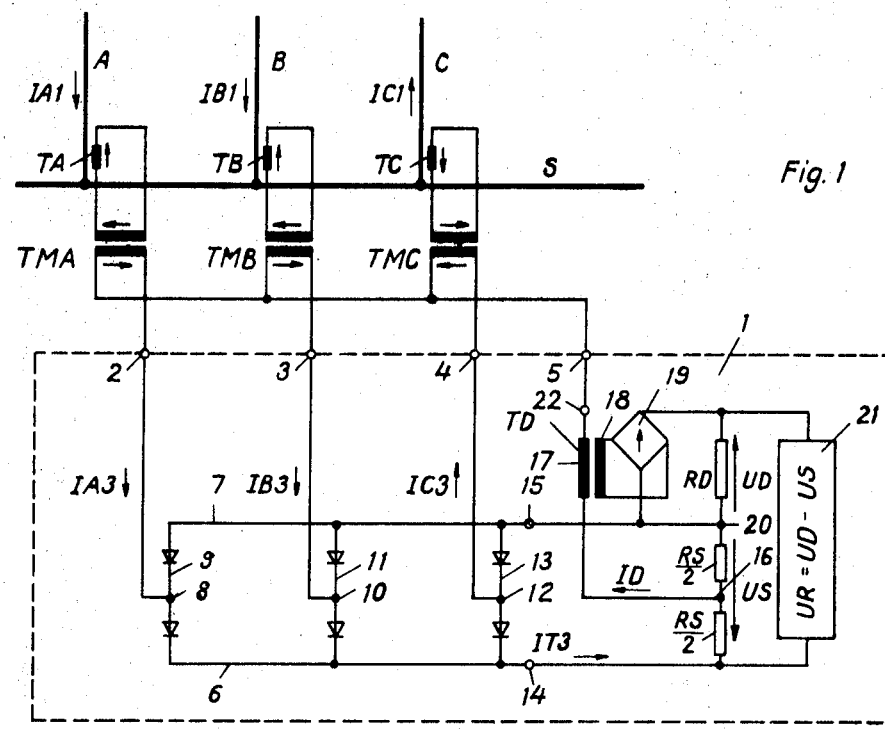
FIG. 1 shows the protection connected to a bus bar with, as an example, three feeders.

According to FIG. 1, the three feeders A, B and C are connected to the bus bar S. The arrows IA1 IB1 show that the feeders A and B are feeding current towards the bus bar, whereas the arrow IC1 shows that the feeder C draws a current away from the bus bar. Each feeder has a line current transformer TA, TB and TC and the arrows indicate the directions of the associated currents. This FIG. also shows that an auxiliary current transformer TMA, TMB and TMC is connected in the corresponding line current transformer secondary circuit. The auxiliary current transformers may be arranged with a turns ratio of 1/1, 1/2, 1/3 .....1/20 and even higher, depending on the actual turn ratios of the line current transformers.

The main relay protection circuit may be said to be included within the shown broken line 1, with the terminals 2, 3, 4 and 5 associated with the feeders A, B and C. The relay circuit has two wires 6 and 7 and between these two diodes are connected for each of the feeders A, B and C. The midpoint 8 of the diode set 9 is connected to the terminal 2. Similarly, the midpoint 10 of the diode set 11 is connected to the terminal 3 and the midpoint 12 of the diode set 13 is connected to the terminal 4. The directions of the associated currents are shown by the arrows IA3, IB3 and IC3. The wires 6 and 7 are extended to terminals 14 and 15. Between these terminals there are connected in series two identical resistors RS/2 with a midpoint 16. From terminal 14 flows the total incoming current IT3. The midpoint 16 is connected to the terminal 5 through the primary winding 17 of the transformer TD. The secondary winding 18 is connected to the rectifier bridge 19 which feeds the differential circuit resistor RD. At one end, this resistor is connected to the point 20 which is associated with terminal 15. An output relay 21 is connected across the three resistors RD and RS/2. The current from point 16 towards the terminal 5 is denoted ID and is equal to the difference between the incoming current IT3 and the outgoing current IC3.

During normal conditions $I_{T3}$=IA3+IB3=IC3. The current IT3 passes one of the resistors RS/2 and the current IC3 the other. The voltage drop thereby produced across RS is denoted US and shown by an arrow in FIG. 1. Since IT3=IC3, the differential current ID must be zero. Hence, the secondary current from TD towards RD and the voltage drop UD must also be zero. The relay 21 is polarized, i.e. it can only operate when UD is greater than US. During normal conditions when UD is zero and US greater than zero, the relay 21 is subjected to the restraining voltage US only, and operation cannot occur.

Figure 2:
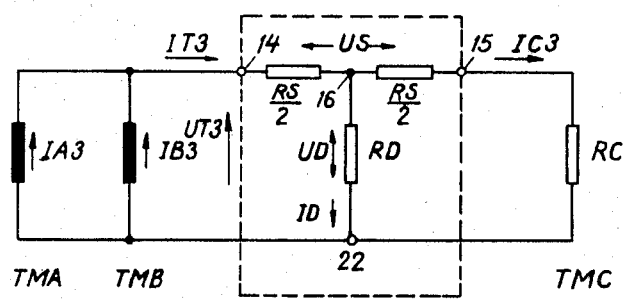
FIG. 2 shows the current distribution in the case of external faults.

FIG. 2 shows the conditions with an external fault on feeder C, with the fault current fed through the bus bar. The diodes in FIG. 1 through which the currents IA3, IB3 and IC3 must pass have for simplicity been neglected in FIG. 2. When the primary fault current, in the same direction as IC1 in FIG. 1, is very large, the line current transformer TC will very quickly become saturated i.e. its e.m.f. will be reduced to zero. The current IC3 leaving terminal 15, in FIGS. 1 and 2 is therefore produced by the output voltages from the auxiliary current transformers TMA and TMB only, i.e. by the voltage UT3 in FIG. 2. The effective total resistance which the current IC3 is passing (including the resistance of TMC and TC, and any lead resistance) is denoted RC. The present invention is based on the fact that RC is basically a pure resistance, i.e. with negligible reactance.

By selecting suitable resistance values for RD and RS/2, and a suitable turns ratio ND for TD the protection devices can be proved to be stable for a given value of RC.

As an example, and for the sake of simplicity, it may be assumed that:
ND=1/1
RD=30 ohms
RS12=10 ohms
RC=20 ohms If these values are inserted in FIG. 2 it is seen that ID becomes equal to IC3 because the two branch circuits between the points 16 and 22 have the same resistance, i.e. RD=RS/2 +RC=30 ohms.

Hence: ID=IC30.5IT3
and UD=0.5IT3×30 ohms =15IT3
also US=IT3×ohms +0.5IT3×10 ohms
i.e. US=15IT3

The voltages UD and US are therefore equal and the relay 21 cannot operate. Since ID=0.5IT3 in this particular case, the percentage stability characteristic is denoted as 50 percent. If RC should be reduced below 20 ohms IC3 will increase and ID will be reduced, i.e. US will increase and become larger than UD. It can be concluded that for the case of RC equal to or less than 20 ohms, the protection devices in the given example cannot maloperate on external faults, even if the fault current is infinite.

Figure 3:
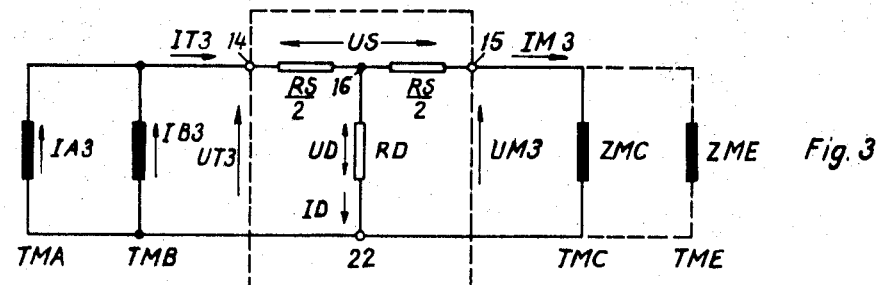
FIG. 3 the current distribution in the case of internal faults.

FIG. 3 shows the conditions in the case of internal faults, fed by the feeders A and B. The third feeder C is considered to be disconnected or unloaded. The current transformer secondary circuit of feeder C is connected to terminal 15, FIG. 3, where ZMC represents the total magnetizing impedance of TC and TMC. If another unloaded feeder, E, should be connected to the bus bars, its secondary circuit may be represented by the impedance ZME, as shown by broken lines. By referring to the above example for FIG. 2, it follows that the protection will operate for internal faults provided that the impedance $ZM3=UM3/IM3$ is greater than RC, i.e. in the given example ZM3 must be greater than 20 ohms. In a practical case this impedance will be in the region of 5000—10,000 ohms per feeder.

In the above discussions and in FIGS. 1, 2 and 3, a certain positive reference direction has been assumed for the AC currents IA1, IB1, IC1 and the corresponding relay currents IA3, IB3, IC3. If these currents are reversed, the same results will, however, be obtained, i.e. if a certain voltage is imposed on the output relay 21 during a positive half-cycle, this voltage will also be imposed during a negative half-cycle.

I claim:

1. Percentage differential protection device for electric bus bars to which a number of feeders are connected, said protection device comprising a relay having two terminals, means for operating said relay in response to abnormal conditions in said feeders comprising means for deriving from each of said feeders a current proportional to the current therein, said current deriving means having first and second terminals, a pair of rectifying means for each of said feeders connected in series and a connection between the first of said terminals and the midpoint of said rectifying means, first and second resistors of equal value connected in parallel with said pairs of rectifiers, a connection between the midpoint of said first and second resistors and the second terminals of said current deriving means, means associated with said last connection to derive therefrom a direct current proportional to the current therein, means connecting the end of one of the first resistors remote from said midpoint to one terminal of said relay, means including a third resistor connecting the end of the second resistor remote from said midpoint to the other terminal of the relay, said third resistor being connected in parallel with said direct current deriving means.

2. Percentage differential protection device as claimed in claim 1 in which said third resistor and said direct current deriving means constitute a differential circuit, and in which said direct current deriving means comprises a transformer, and said first and second resistors constitute a stabilizing circuit.